(12) United States Patent
Luo et al.

(10) Patent No.: US 7,801,403 B2
(45) Date of Patent: Sep. 21, 2010

(54) OPTICAL FIBER GRATING TUNING DEVICE AND OPTICAL SYSTEMS EMPLOYING SAME

(76) Inventors: Fei Luo, 11 Belknap Ter., Winchester, MA (US) 01890; Tung Feng Yeh, 255 Lincoln St., Waltham, MA (US) 02451

( * ) Notice: Subject to any disclaimer, the term of this patent is extended or adjusted under 35 U.S.C. 154(b) by 175 days.

(21) Appl. No.: 12/176,504

(22) Filed: Jul. 21, 2008

(65) Prior Publication Data

US 2009/0110009 A1     Apr. 30, 2009

Related U.S. Application Data

(60) Provisional application No. 61/000,992, filed on Oct. 30, 2007.

(51) Int. Cl.
*G02B 6/34* (2006.01)
*G02B 6/00* (2006.01)
(52) U.S. Cl. .......................... 385/37; 385/147
(58) Field of Classification Search .......... 385/24, 385/37, 147; 372/6, 20, 64, 92
See application file for complete search history.

(56) References Cited

U.S. PATENT DOCUMENTS

| 5,469,520 | A | 11/1995 | Morey et al. |
| 6,229,827 | B1 | 5/2001 | Fernald et al. |
| 6,360,042 | B1 * | 3/2002 | Long ............................ 385/37 |
| 6,363,089 | B1 | 3/2002 | Fernald et al. |
| 6,636,667 | B2 * | 10/2003 | Wang et al. .................... 385/37 |
| 6,792,009 | B2 * | 9/2004 | Putnam et al. ................. 372/6 |

* cited by examiner

*Primary Examiner*—Akm E Ullah
(74) *Attorney, Agent, or Firm*—Anderson, Gorecki & Manaras LLP (57) ABSTRACT

A tuning device for an optical fiber grating includes a multi-part confinement member. The confinement member includes a feature such as a channel in which the fiber grating is disposed. Movement of the different parts of the confinement member relative to one another causes compression or tension of the fiber grating. The confinement member may include first and second slides. One end of the fiber is bonded to the first slide, the other end of the fiber is bonded to the second slide. The grating section of the fiber is confined in a channel formed by adjacent surfaces of the slides. The dimensions of the channel are selected such that the fiber grating is maintained in a relatively straight orientation without buckling when compression strain is applied to the fiber. An actuator may be employed to control the strain applied to the fiber, i.e., to axially compress or stretch the fiber grating by driving one or both of the slides in a controlled manner. The resonance wavelength of the fiber grating can be tuned as a function of the strain applied to the fiber. The confinement member may alternatively include deformable slides which axially deform, i.e., extend and retract so as to change in length. Each end of the fiber is affixed to both of the deformable slides so that axial compression or stretching of the fiber grating is achieved through deformation of the deformable slides. The fiber grating tuning device can be deployed in components such as tunable fiber lasers and tunable fiber filters.

20 Claims, 8 Drawing Sheets

A-A Section View

OPTICAL FIBER GRATING TUNING DEVICE AND OPTICAL SYSTEMS EMPLOYING SAME

CROSS-REFERENCE TO RELATED APPLICATIONS

A claim of priority is made to U.S. Provisional Patent Application Ser. No. 61/000,992, entitled Optical Fiber Grating Tuning Device and Optical Systems Employing Same, filed Oct. 30, 2007, which is incorporated by reference.

FIELD OF THE INVENTION

The present invention is generally related to optical fiber devices, and is more particularly related to tuning optical fiber gratings.

BACKGROUND OF THE INVENTION

Optical fiber gratings have many applications and are widely used in fiber optic communication systems, fiber optic sensors and fiber lasers to selectively control the wavelength of light propagating in an optical fiber. A typical fiber grating includes a length of optical fiber in which a section of the fiber core has been modified to include a plurality of periodic perturbations in refractive index along the length of the fiber. Generally, there are two types of fiber gratings that are formed in this manner: Fiber Bragg Gratings (FBGs) and Long Period Fiber Gratings (LPFGs). LPFGs are distinguished from FBGs by differences in the periodic spacing of the perturbations.

FBGs reflect light at a wavelength $\lambda_B$, characterized by $\lambda_B = 2n\Lambda_B$, known as the Bragg condition, or Bragg wavelength, where $\lambda_B$ is the center wavelength of reflected light from the grating, n is the effective refractive index of the fiber core, and $\Lambda_B$ is the period of refractive index modulation in the fiber. FBGs generally have good wavelength selection capability as a narrow band reflective mirror. The center wavelength, a.k.a., resonance wavelength, of an FBG may be affected by changes in strain and temperature. For example, for a given strain $\epsilon_z$, the center wavelength shift of the FBG is $\Delta\lambda_B = \lambda_B(1-p)\epsilon_z$, where p is an effective strain-optic constant. For a given temperature change $\Delta T$, the center wavelength shift is $\Delta\lambda_B = \lambda_B(\alpha_A + \alpha_B)\Delta T$, where $\alpha_A$ is the thermal expansion coefficient of the fiber and $\alpha_B$ represents the thermo-optic coefficient. For a typical FBG with center wavelength at 1550 nm, the strain induced wavelength shift is about 2 pm/µε, and the temperature change induced wavelength shift is around 12.8 pm/° C. These physical characteristics can be used to tune the center wavelength of a FBG, i.e., by applying controlled strain or heat to the FBG.

LPFGs have a physical configuration similar to that of FBGs, but the LPFG grating period $\Lambda_L$ is much longer than the FBG grating period $\Lambda_B$. In particular, $\Lambda_L$ is typically 200~2000 times longer than $\Lambda_B$. The LPFG operates by coupling the fundamental mode in the fiber core to the cladding modes of the fiber. The excited cladding modes are then attenuated, resulting in the appearance of resonance loss in the transmission spectrum. Consequently, in contrast to FBGs, LPFGs do not produce reflected light. Phase matching between the fundamental mode and cladding modes at wavelength $\lambda_{mL}$ can be expressed as: $\lambda_{mL} = (n_{core} - n_{cl}^m)\Lambda_L$; where, $n_{core}$ is the effective refractive index of the fundamental mode and $n_{cl}^m$ is the effective refractive index of the $m^{th}$ cladding mode, and $\Lambda_L$ is the period of the LPFG. Since several cladding modes can satisfy this condition, each one is at different center wavelength $\lambda_{mL}$. Consequently, the transmission spectrum of the LPFG exhibits a series of transmission loss peaks along the spectrum distribution. Similar to FBGs, the center wavelength (resonance wavelength) of LPFGs is also affected by changes in strain and temperature. Therefore, the resonance wavelength of LPFG can be tuned by applying controlled strain or heat to the LPFG.

For applications including but not limited to fiber grating-based tunable filters, fiber sensor demodulation systems and tunable fiber lasers, it is desirable to be able to tune the resonance wavelength of fiber gratings over a large wavelength range. As already mentioned, it is known to tune a fiber grating via strain, e.g., stretching or compressing a fiber grating, and also via application of heat, e.g., directly heating the fiber grating or using a heating element packaged with the fiber grating to apply a strain on fiber grating. However, thermal tuning is somewhat problematic because it can cause degradation of the fiber grating, and the tuning range is relatively small due to the practical limits of the temperatures that can be applied. With regard to strain tuning, it is known that compressing a fiber grating provides a potentially greater tuning range than stretching the fiber grating because an optical fiber is up to 20 times stronger in compression than in tension. However, since the fiber is very thin, e.g., a typical diameter of about 125 um, applying axial compression strain to the fiber without inducing buckling of the fiber presents some difficulty.

Techniques are known for preventing compression buckling. One technique, described by Morey, et al in U.S. Pat. No. 5,469,520, entitled "Compression Tuned Fiber Grating," is to put a FBG in sliding ferrules and place the ferrules in a mechanical structure to guide and confine the fiber. However, the Morey's technique requires ferrules of precise diameter, and highly accurate ferrule alignment. Another technique, described by Fernald et al in U.S. Pat. Nos. 6,229,827 and 6,363,089 entitled "Compression-Tuned Bragg Grating and Laser," fuses the FBG in a glass capillary tube. However, the resulting device is difficult to handle during manufacturing operations. Another technique, described by Long in U.S. Pat. No. 6,360,042, entitled "Tunable optical fiber gratings device," is to bond the FBG on a cantilever beam. The beam can then be bent in different directions, resulting in application of compressive or tensile strain of the FBG. It would be desirable to have an improved technique to facilitate tuning of fiber gratings over a wide wavelength range that does not suffer some or all of the limitations of known techniques.

SUMMARY OF THE INVENTION

In accordance with one embodiment of the invention, an apparatus for tuning an optical fiber grating, comprises: a multi-part confinement member which defines a channel in which the optical fibre grating is disposed, the optical fiber grating being affixed to the multi-part confinement member such that movement of a first part in a first direction relative to a second part exerts compressive or tensile axial force on the optical fibre grating, the channel preventing the optical fibre grating from buckling in response to the compressive axial force.

In accordance with another embodiment of the invention, an apparatus for tuning an optical fiber grating, comprises: a confinement member which defines a channel in which the optical fibre grating is disposed, the optical fiber grating including at least one deformation feature, and being affixed to the confinement member such that contraction or expansion of the confinement member resulting from axial deformation exerts compressive or tensile axial force on the optical fibre grating, the channel preventing the optical fibre grating from buckling in response to the compressive axial force.

DETAILED DESCRIPTION

Figure 1:
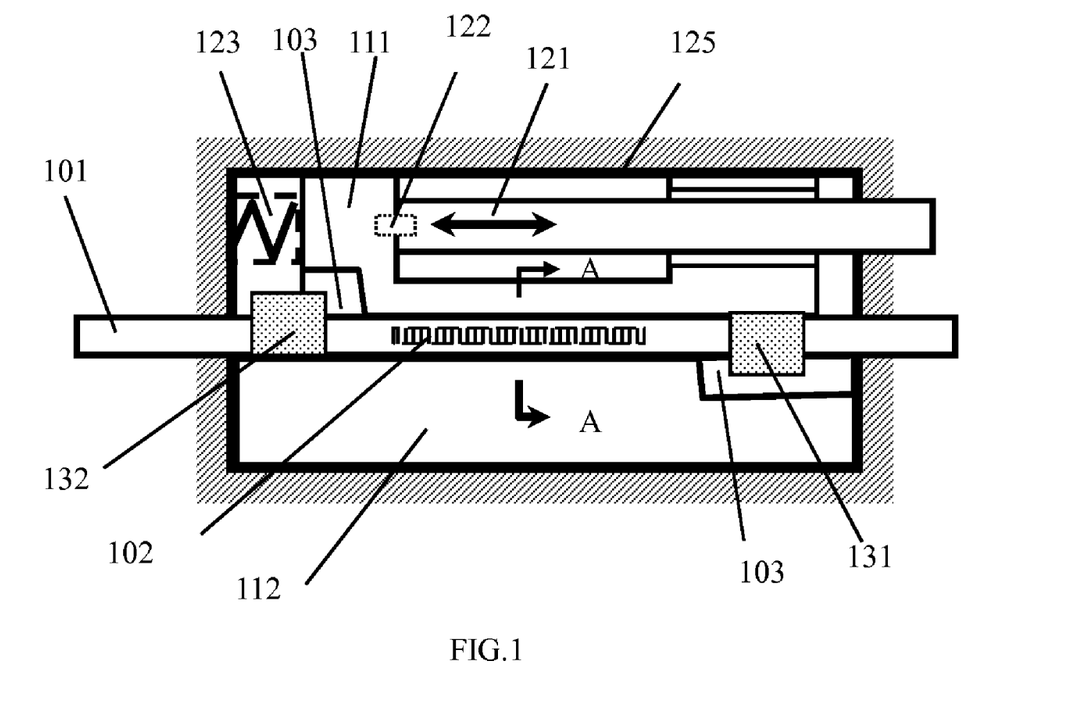
FIG. 1 is a side view of a device for facilitating fiber grating tuning in accordance with one embodiment of the present invention.
Figure 2:
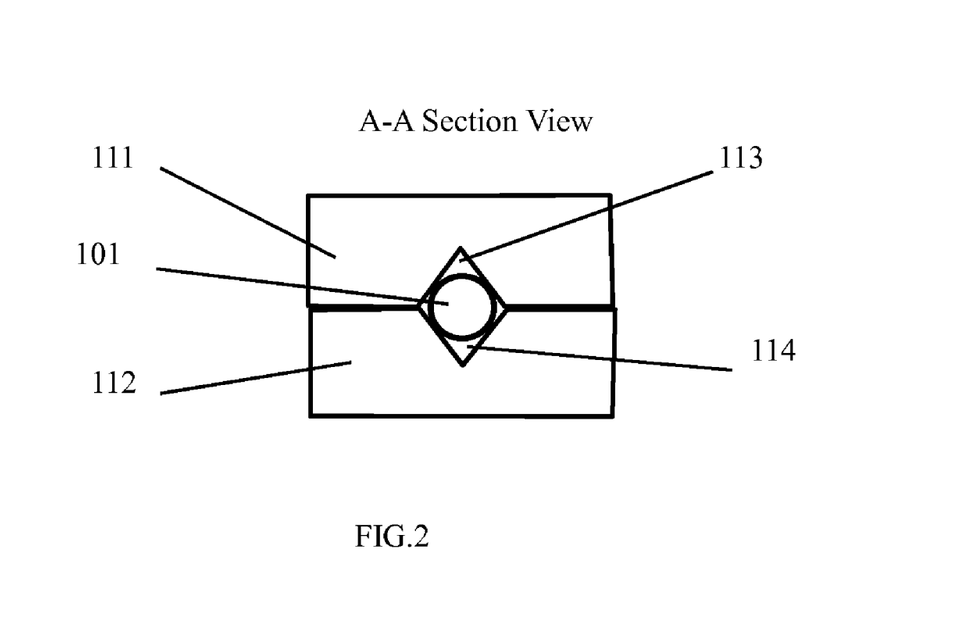
FIG. 2 is a section view taken along line A-A of FIG. 1, illustrating the fiber grating section is sitting in "V" channels of the slides and confined by the channels.

Referring to FIGS. 1 and 2, in one embodiment of the invention a fiber grating tuning device for an optical fiber 101 with a fiber grating section 102 in the fiber core includes a multi-part containment device in which the parts move relative to one another. One example of such a containment device is provided by slide members 111, 112. The grating section 102 of the fiber 101 is placed in a channel defined between slide 111 and slide 112 when mating faces of the slides are disposed against each other. The channel formed by slides 111 and 112 extends the full length of the slides and is large enough in cross-section to accommodate the fibre, e.g., precisely matched to, or slightly greater than, the diameter of the fiber. A segment 132 near one end of the fiber is affixed to slide 112 via bonding or other techniques. A segment 131 near the opposite end of the fiber is similarly affixed to slide 111. The slides 111 and 112 are disposed in a frame 125. Slide 112 is affixed to frame 125, and slide 111 is free to move linearly relative to slide 112 and the frame. Small gaps 103 are provided between slides 111, 112 and fiber fixing segments 131, 132 under strain-free conditions in order to allow slide 111 to move relative to slide 112, and thereby compress the fiber. These gaps may be relatively small, e.g., <1 mm, and may be filled with polymer materials. The tip of the actuator may be affixed to slide 111 using a fastener such as bolt 122. A resilient member such as spring 123 applies counter-force to slide 111 to assist recovery from movement of slide 111, i.e., to help move slide 111 the relatively small distance required to reduce or eliminate the compression strain on the fiber. The compression spring may be preloaded for assisting slide 111 in recovery movement and also assisting stretch-tuning of the fiber grating.

An actuator 121 for driving one or more of the slides can be implemented using any of various suitable components. For example, and without limitation, a micrometer, piezo component, stepper motor, servo motor, or thermal based device could be used. Similarly, the compression spring 123 may be implemented with any of various components including, without limitation, metal and polycarbonate springs, and resilient polymer materials. The channel defined by the slides may also be lined with a polymer material to enhance fiber protection and prevention of compressive buckling.

The actuator 121 provides control over movement of the slide for the relatively small distance required to apply strain to the fiber. Drive control enables tensile and compressional tuning of the fiber grating. For example, the actuator 121 can be used on slide 111 to increase compression of the fibre (moving slide 111 to the left in the illustration) by a precise selected amount. Since the two opposite ends of the fiber are secured to the slides 111 and 112, respectively, fiber grating 102 is subjected to compression that is proportional to the magnitude of the driving force applied by the actuator 121. The compression strain is adjusted until the desired reduction of resonance wavelength of the fiber grating is achieved. Advantageously, a wide range of adjustment is made available because the containment feature inhibits fibre buckling under compressional strain. Actuator 121 may also be utilized to drive slide 111 to apply tensile force (moving slide 111 to the right in the illustration), resulting in application of tensile strain to fiber grating and increase of the resonance wavelength of the fiber grating.

Figure 3A:
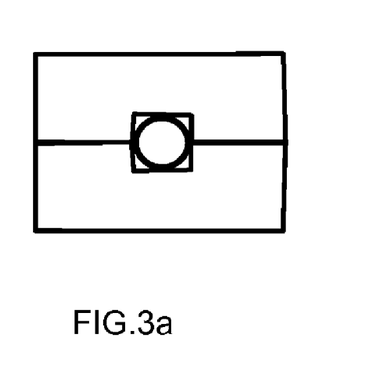
FIGS. 3a, 3b, 3c and 3d illustrate various channel shapes for confining the fiber and guiding the fiber in the axial direction only.
Figure 3B:
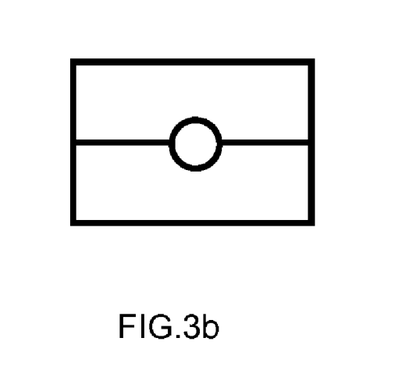
Figure 3C:
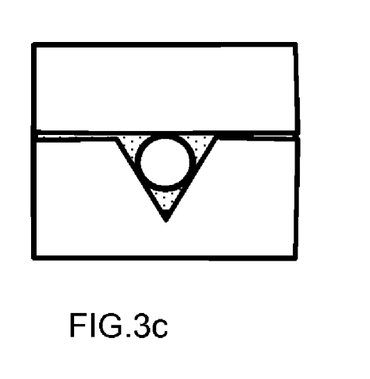
Figure 3D:
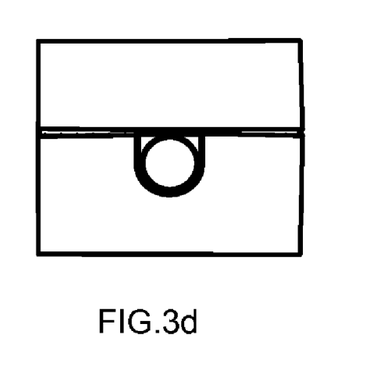

FIGS. 3a, 3b, 3c and 3d illustrate various embodiments of the slides, and in particular, embodiments of the channels formed by the slides. In order to perform the function of confining the optical fiber such that the fibre does not buckle under stress, the slides may contact the fiber along lines or multi-dimensional surfaces, e.g., points or arcs in two-dimensional cross-section. FIG. 3a illustrates slides that form a channel of rectangular cross-section, providing four lines of contact offset at 90° intervals. FIG. 3b illustrates slides that form a channel of circular cross-section which, if precisely matched to the fibre, results in a cylindrical contact surface. FIG. 3c illustrates a V-shaped channel which may provide three lines of contact. FIG. 3d illustrates a U-shaped channel which provides an arc and point of contact (as viewed in cross-section). One advantage of the V and U shaped channels is that only one slide of the set requires machining of the channel. The channels can have cross-sectional shapes other than those illustrated, including but not limited to any polygons, and the channels need not necessarily be symmetrical or identical on both of the slides.

Figure 4A:
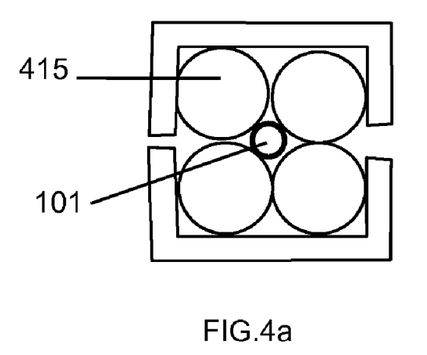
FIGS. 4a, 4b and 4c illustrate that cylindrical wires can be used to define a gap in the channel.
Figure 4B:
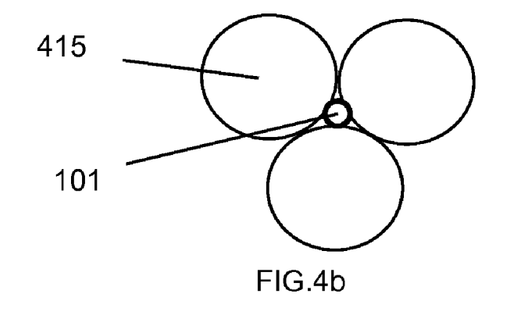
Figure 4C:
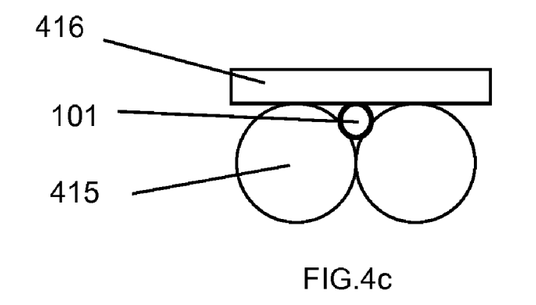

FIGS. 4a, 4b, and 4c illustrate packing members which facilitate fibre confinement in the channel. As illustrated in FIG. 4a, a channel formed by the slides may be lined with packing members such as cylindrical wires 415 to help confine the fibre within a gap formed by the packing members. FIG. 4b illustrates how three cylindrical wires can be used to facilitate fiber confinement, and FIG. 4c illustrates how two cylindrical wires can be used to facilitate fiber confinement against a planar surface 416 of the slide. In each embodiment the fiber 101 is confined in a gap formed by either or both of the wires and a surface of the slide. One advantage of these embodiments is that the channel size can be modified by replacing one or more of the packing members, i.e., with packing members of different diameter.

Figure 5:
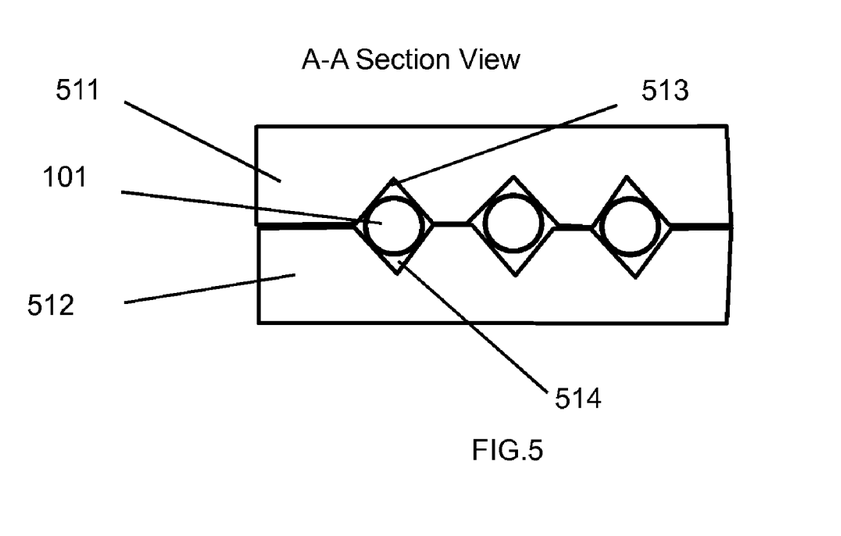
FIG. 5 illustrates how several fiber gratings can be placed in each of the channels on the slides, and that these fiber gratings can be tuned simultaneously.

Referring to FIG. 5, a single set of slides can include a plurality of channels. For example, several parallel channels may be formed. One advantage of having multiple channels per set of slides is that a plurality of fiber gratings can be mounted and tuned simultaneously. The channels may also be configured to accommodate multiple fiber gratings in series.

Figure 6:
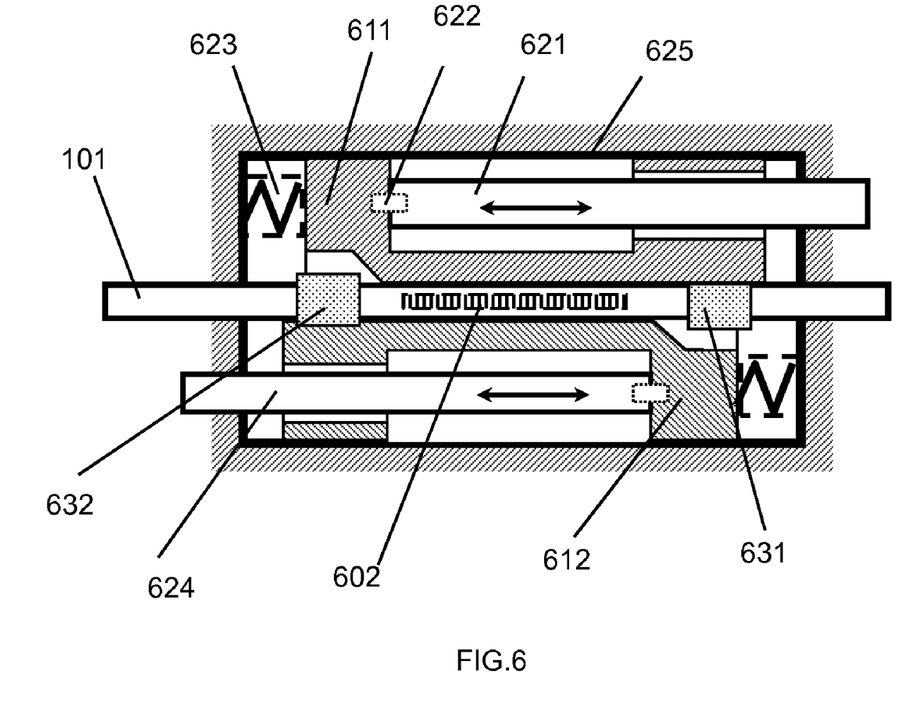
FIG. 6 is a side view illustrating an embodiment where two actuators are employed.

FIG. 6 is a side view of a variation of the embodiment of FIG. 1. In this variation a plurality of actuators 621 and 624 are employed to drive the slides. In particular, actuator 621 drives slide 611, and actuator 624 drives slide 612. The use of multiple actuators can help increase the maximum stress force that can be applied to the fibre.

Figure 7:
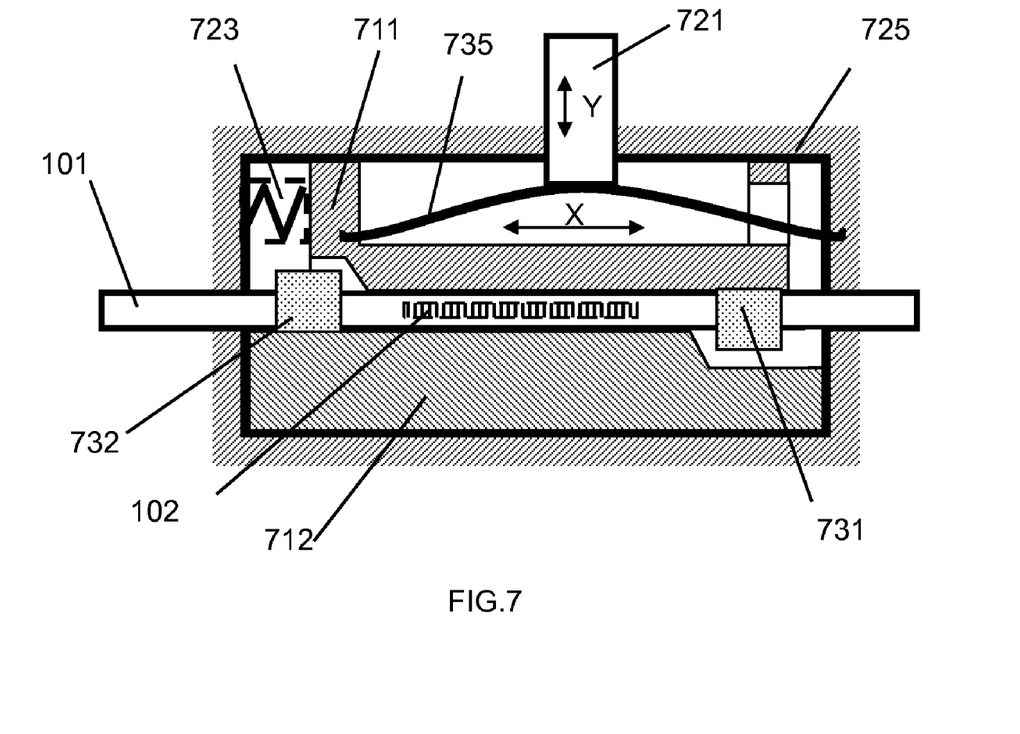
FIG. 7 is a side view of an embodiment where an arc-flat spring is used to facilitate fine tuning of the fiber grating.

FIG. 7 illustrates an alternative drive and actuator mechanism. An arc-flat spring 735 is employed to impart motion to the slide 711. One end of the arc-flat spring 735 is affixed to slide 711, and the other end of the arc-flat spring is affixed to the frame 725, or slide 712, or both. When actuator 721 pushes against the arc-flat spring 735, i.e., in the Y-axis, the arc-flat spring elongates, i.e., expands in the X-axis, thereby causing slide 711 to move (move to the left in the illustration). The result of this action is compression of the fiber and the fiber grating 102. As already explained, the applied compressive strain can be used to tune the grating. When the actuator 721 pulls the arc-flat spring 735 in the Y-axis, the arc-flat spring retracts in the X-axis. This results in application of tension to the fibre, which can be used to tune the grating. The motion can also be used to relieve compressive or tensile strain. The compression spring 723 can also provide a preloaded force against slide 711 to assist recovery movement (from compression or tension force to zero force) during loading and unloading.

Figure 8:
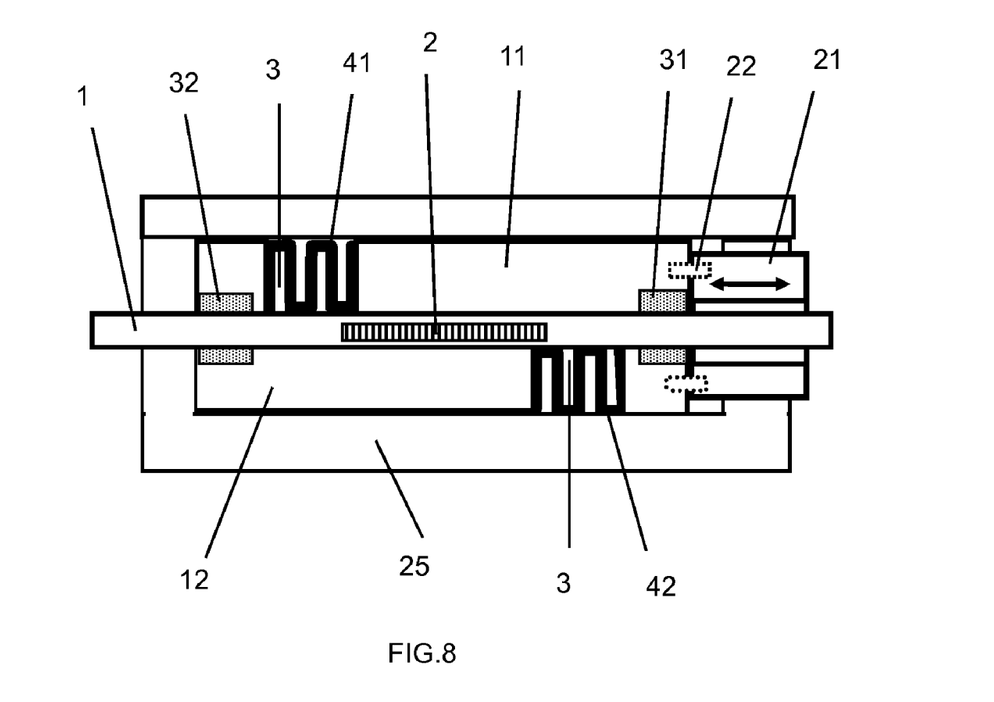
FIG. 8 is a side view of an embodiment where corrugated deformable slides are used.
Figure 9:
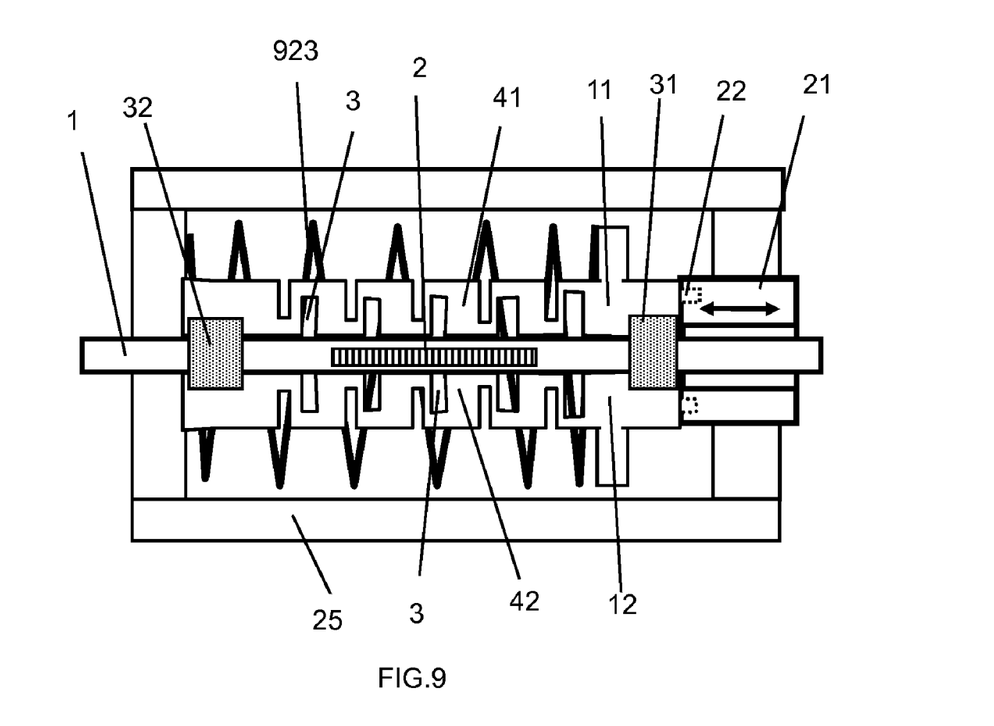
FIG. 9 is a side view of an embodiment where the two corrugated deformable slides are symmetrically placed, and a preloaded spring is used.

FIGS. 8 and 9 illustrate another alternative embodiment of the invention in which deformable slide members are utilized. In the illustrated examples the fiber grating 2 is sandwiched between two deformable slides 11, 12 which confine the fiber grating 2 in a channel which may be of any suitable shape, including but not limited to those already described above with respect to non-deformable slides. Unlike the embodiments already described, each end of the fiber 1 is affixed to both slides. In particular, the fiber is affixed at segments 31 and 32. The slides 11 and 12 have a deformation-enabling feature such as a corrugated section 41, 42, which enables the slides to deform axially in response to movement of the actuator 21. As a result of axial contraction or elongation of the deformable slide members, the fibre grating is controllably stressed in compression or tension, thereby enabling tuning. The corrugated sections may include small notched gaps 3 which are typically <1 mm in order to allow deformation and prevent fiber buckling during compression. The gaps may be filled with material such as a polymer in order to facilitate fiber confinement and increase service life. The corrugated sections and slides can also be either single or multiple piece components, i.e., the corrugated section may be a distinct part. Further, the corrugated sections may be disposed in either a staggered, offset arrangement as specifically shown in FIG. 8, or in a symmetrical arrangement as specifically shown in FIG. 9. A resilient member such as spring 923 may be used as shown in FIG. 9 to apply counter-force to slides 11 and 12 to assist recovery from movement of deformable slides 11 and 12, i.e., to help move slides 11 and 12 the relatively small distance required to reduce or eliminate the compression strain on the fiber. The compression spring may be preloaded for assisting deformable slide 11 and 12 in recovery movement and also assisting stretch-tuning of the fiber grating.

The principle of operation of the deformable slides is somewhat similar to that of the non-deformable slides. When the actuator 21 is moved in a direction (to the left in the illustrated example) which exerts compressive force on the deformable slides 11, 12, compressive stress is also applied to the fibre grating. As a result, the resonance wavelength of the grating becomes shorter. When the actuator 21 is moved in a direction (to the right in the illustrated example) which exerts tensile force on the deformable slides 11, 12, the slides are stretched, resulting in application of tensile stress on the fiber grating and increase of the resonance wavelength of the grating.

Figure 10:
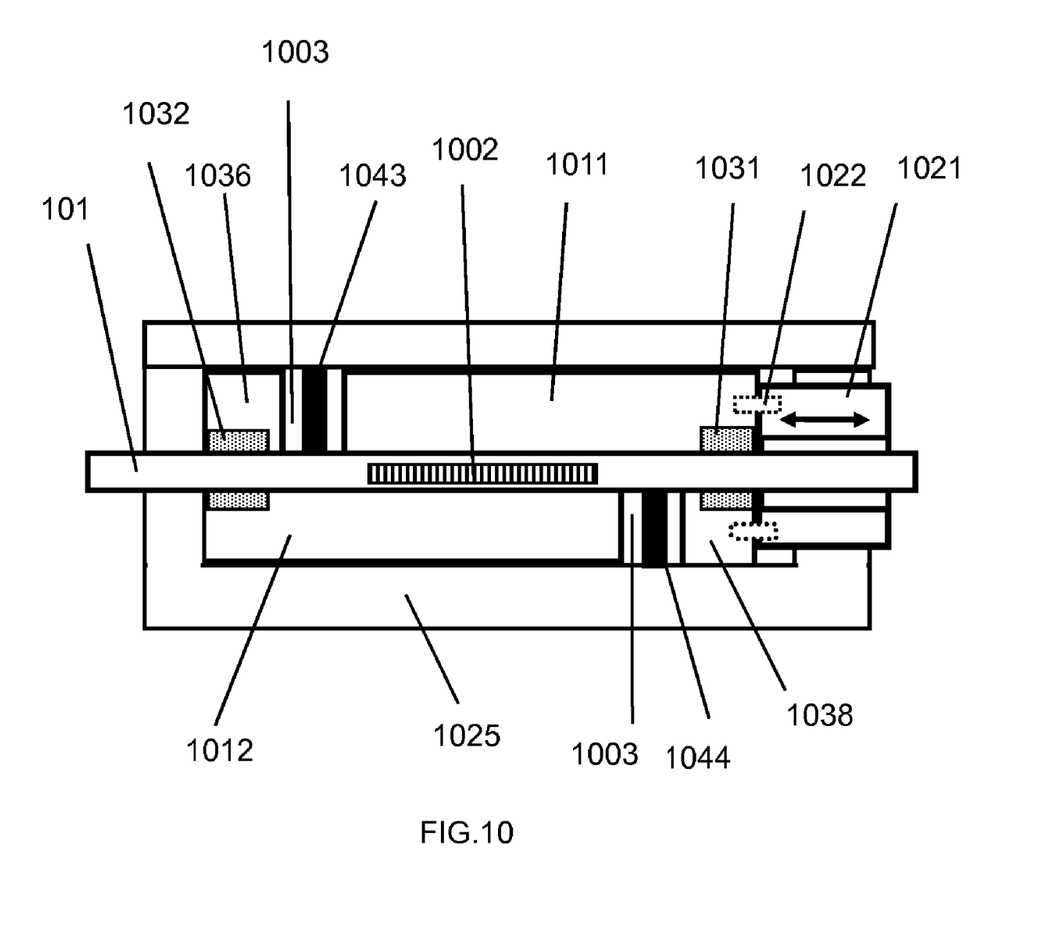
FIG. 10 is a side view of an embodiment where a spacer is used.

FIG. 10 illustrates an alternative embodiment in which the slide members include spacers 1043, 1044. Small gaps 1003 are provided adjacent to the spacers in order to allow a small amount of movement of the members to apply compressive strain on fiber grating for compressive tuning of the fiber grating. Additional spacers or spacers of different size may be used to achieve different tuning ranges; or, for greater simplicity, may be used without spacers but with small gaps 1003 between 1036, 1011 and between 1012, 1038. The gaps may be filled with a resilient material such as a polymer. Alternatively, the volume that would otherwise form the gaps is occupied by the spacers, which are made of soft resilient material such as a rubber or polymer which occupies the variable volume between 1036 and 1011, 1038 and 1012.

It should be noted that the embodiments described above can be used to tune various types of fiber gratings or fiber grating combinations, including but not limited to fiber Bragg gratings, long period fiber gratings, phase shifted fiber gratings, chirped fiber gratings, cascaded fiber gratings and superimposed fiber gratings. Further, the fiber gratings can be in various types of fiber, including but not limited to a single mode fiber, PM fiber, multi mode fiber, double clad fiber, rare earth doped optical fiber or photonic crystal fiber. Further, multiple fiber gratings could be also in series in one channel and tuned together, or in parallel channels and tuned together.

Figure 11:
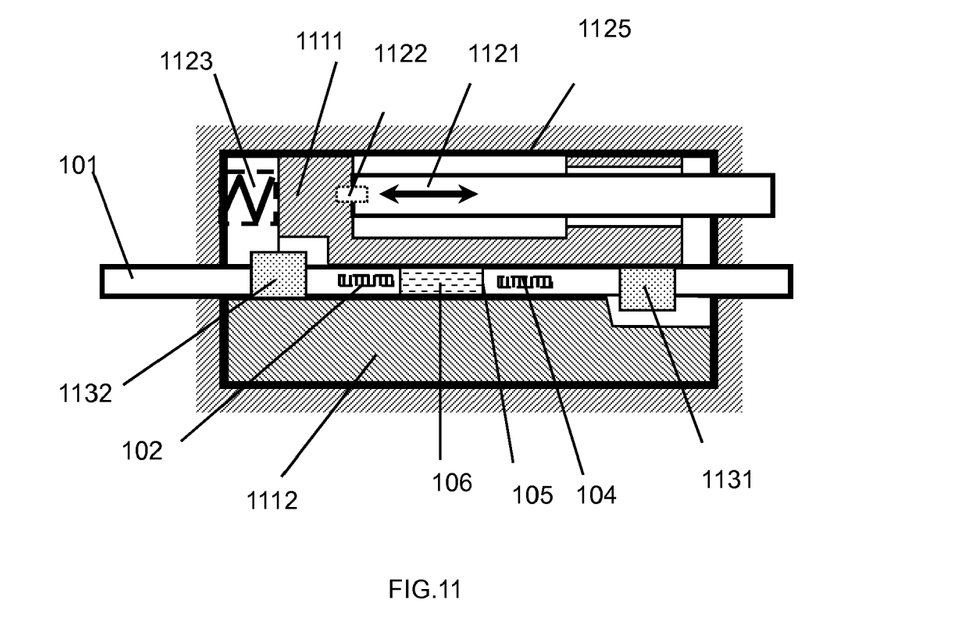
FIG. 11 illustrates a tunable fiber laser based on the tunable fiber grating technique.

FIG. 11 illustrates use of an embodiment of the invention to form a tunable fiber laser. The laser includes an active fiber 106 which is spliced to FBG 102 and FBG 104. The FBGs 102, 104 function as narrow band reflectors which are characterized by the same center wavelength. A laser resonance cavity is formed by the combination of the active fiber 106 with FBGs 102, 104 at both ends. The FBGs 102, 104 are disposed in a confinement channel defined between slides for applying compression or tension to the FBGs. The lasing wavelength is determined by the center wavelength of the FBG pair 102, 104. Consequently, the lasing wavelength of the fiber laser is adjusted in response to changing the center wavelength of the FBGs 102, 104. The active fibers 106 are typically rare earth doped fibers, e.g., Er, Yb, Nd, Er/Yb or Thulium doped fiber, for generating laser at various wavelength bands. The active fibers and FBG fibers can have various structures including but not limited to single mode fibers, multimode fibers, PM fibers, double clad fibers or photonic crystal fibers. Within each wavelength band the lasing wavelength can be tuned by tuning of the center wavelength of fiber Bragg gratings. Alternatively, the FBG or phase shifted FBG can be implemented in the active fiber to form a distributed feedback (DFB) fiber laser for single frequency laser oscillation. The wavelength of such a DFB fiber laser is tunable by applying compression or tension to the grating according to the techniques described above.

It should be noted that the invention has other applications, including but not limited to tunable fiber filters, tunable dispersion compensators for optical fiber communication, and use in fiber sensor systems for demodulation.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Apparatus for tuning an optical fiber grating, comprising:
a multi-part confinement member which defines one or more channels in which at least one optical fibre grating is disposed, first and second non-adjacent parts of the optical fiber grating being affixed to the multi-part confinement member such that movement of the first part in a first direction relative to the second part exerts compressive axial force on the optical fibre grating, the channel preventing the optical fibre grating from buckling in response to the compressive axial force.

2. The apparatus of claim 1 wherein movement of a first part in a second direction relative to a second part exerts tensile axial force on the optical fibre grating.

3. The apparatus of claim 1 wherein the channel is characterized by a cross-sectional shape selected from: V-shaped, U-shaped, rectangular, circular and polygons not already listed.

4. The apparatus of claim 1 further including at least one actuator for driving at least one part of the confinement member, the actuator including at least one of: a micrometer, piezo actuator, stepper motor or servo motor driven actuator, and thermal based device.

5. The apparatus of claim 4 further including an arc-flat spring connected to the actuator and confinement member, the arc-flat spring being actuated by the actuator to cause movement of at least one part of the confinement member.

6. The apparatus of claim 1 further including at least one preloaded spring which exerts force upon at least one part of the confinement member to assist recovery from compression of the optical fiber grating and to assist applying tensile strain on optical fiber grating.

7. The apparatus of claim 1 wherein at least one channel is configured to accommodate multiple fiber gratings in series.

8. The apparatus of claim 7 wherein an active fiber is connected between fiber gratings in series to form a fiber laser cavity.

9. The apparatus of claim 1 wherein the optical fiber grating includes a phase shifted optical fiber grating formed in active fibers to form a DFB fiber laser cavity.

10. The apparatus of claim 1 further including at least one packing member disposed in the channel.

11. Apparatus for tuning an optical fiber grating, comprising:
a confinement member which includes at least one deformation feature that defines one or more channels in which at least one optical fibre grating is disposed, first and second non-adjacent parts of the optical fiber grating being affixed to the confinement member such that contraction of the confinement member resulting from axial deformation exerts compressive axial force on the optical fibre grating, the channel preventing the optical fibre grating from buckling in response to the compressive axial force.

12. The apparatus of claim 11 wherein the deformation feature includes at least one corrugated section.

13. The apparatus of claim 11 wherein movement of a first part in a second direction relative to a second part exerts tensile axial force on the optical fibre grating.

14. The apparatus of claim 11 wherein the channel is characterized by a cross-sectional shape selected from: V-shaped, U-shaped, rectangular, circular and polygons not already listed.

15. The apparatus of claim 11 further including at least one actuator for driving the confinement member, the actuator including at least one of: a micrometer, piezo actuator, stepper motor or servo motor driven actuator, and thermal based device.

16. The apparatus of claim 11 further including at least one preloaded spring which exerts force upon at least one part of the confinement member to assist recovery from compression of the optical fiber grating and to assist applying tensile strain on optical fiber grating.

17. The apparatus of claim 11 wherein at least one channel is configured to accommodate a plurality fiber gratings in series.

18. The apparatus of claim 17 wherein an active fiber is connected between fiber gratings in series to form a fiber laser cavity.

19. The apparatus of claim 11 wherein the optical fiber grating includes a phase shifted optical fiber grating formed in active fibers to form a DFB fiber laser cavity.

20. The apparatus of claim 11 further including at least one packing member disposed in the channel.

* * * * *